W. M. KNAPP.
Carriage Seats.
No. 152,124. Patented June 16, 1874.
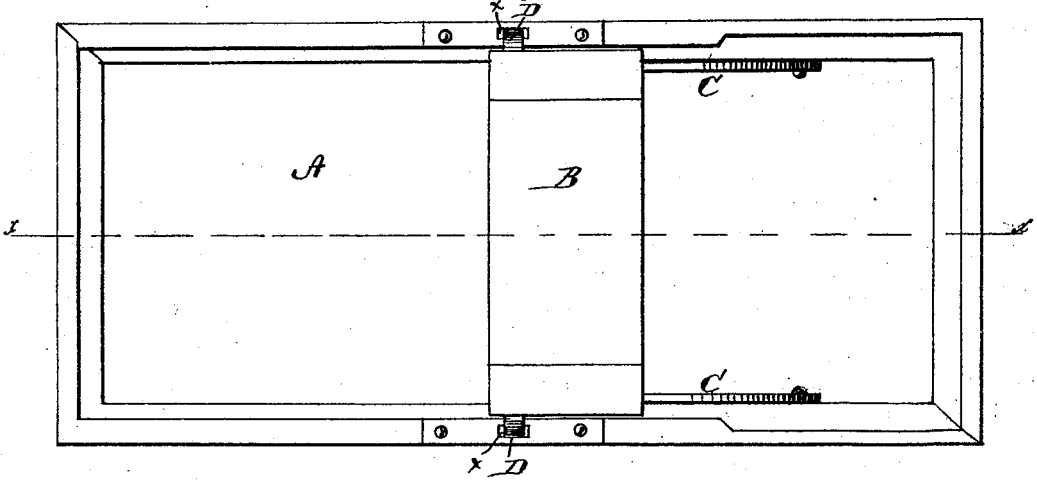
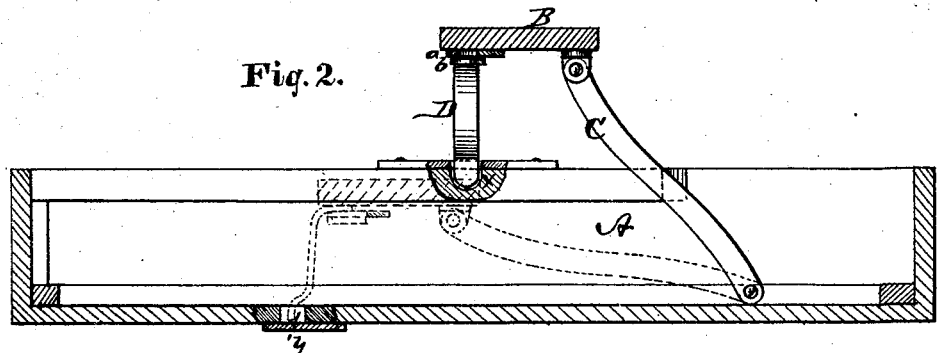
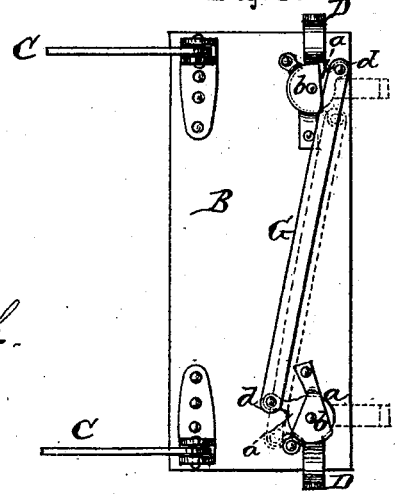

UNITED STATES PATENT OFFICE.

WILLIAM M. KNAPP, OF MUNCIE, INDIANA.

IMPROVEMENT IN CARRIAGE-SEATS.

Specification forming part of Letters Patent No. 152,124, dated June 16, 1874; application filed January 19, 1874.

*To all whom it may concern:*

Be it known that I, WILLIAM M. KNAPP, of Muncie, in the county of Delaware and State of Indiana, have invented certain new and useful Improvements in Carriage-Seats; and I do hereby declare that the following is a full, clear, and exact description thereof, reference being had to the accompanying drawings and to the letters of reference marked thereon, which form a part of this specification.

My invention relates to shifting-seat buggies; and it consists in the construction and arrangement of the rear legs of the front seat, as hereinafter described, whereby the said front seat may be used as a front or driving seat, a child's seat, and placed between the sides of the body to allow the front seat to be moved forward over it, and form a one-seat buggy.

In order to enable others skilled in the art to which my invention appertains to make and use the same, I will now proceed to describe its construction and operation, referring to the annexed drawing, in which—

Figure 1 is a plan view, and Fig. 2 a longitudinal section, of my invention. Fig. 3 is a bottom view of the front seat.

A represents the body of the buggy, and B is the front seat of the same. At the front edge of the seat B, on each side, is pivoted an arm, C, the front end of which is pivoted to the sides of the body A, near the bottom, a suitable distance from the front end. D D represent the rear legs of the seat B. These legs are curved, as shown, and each is provided or formed at its upper end with a horizontal circular part, *a*, through the center of which the leg is pivoted to the under side of the seat, and may be held by a suitable bracket, *b*. The circular part *a* is, on one side, provided with a short projecting arm, *d*, and the arms *d d* are arranged in opposite directions, as shown in Fig. 3, and are connected by a bar, G, pivoted to them.

To operate the front seat, raise it up from the bottom of the body A, and pull one of the legs D outward, which movement will, through the medium of the connecting-bar G, also move the other leg outward, until they are out even with, or far enough to sit, the legs in sockets *x x*, made on the upper side of the body A, when the seat is ready for a driving-seat.

To place the front seat B in position to move the back seat forward and convert the buggy into a one-seat buggy, the seat B is raised out of the sockets *x x*, and one of the legs D is pushed inward, so as to project from the rear side of the seat. This will move both legs inward until they will go down between the sides of the body, and then the seat is dropped down backward until the rear legs rest in sockets *y y* in the bottom of the body.

To make a child's seat, the legs D D are put in shape, as just described; and the seat moved forward toward the dash until it rests against the front of the body and the legs on the bottom.

Having thus fully described my invention, what I claim as new, and desire to secure by Letters Patent, is—

The legs D D, with circular parts *a a*, arms *d d*, and connecting-bar G, in combination with the seat B and pivoted arms C C, connecting it with the body A, substantially as and for the purposes set forth.

In testimony that I claim the foregoing as my own I affix my signature in presence of two witnesses.

WM. M. KNAPP.

Witnesses:
 NATHANIEL LONG,
 D. G. BROWN.